United States Patent [19]

Holcombe et al.

[11] Patent Number: 5,518,621

[45] Date of Patent: May 21, 1996

[54] PROCESS FOR DRYING AND SOLVENT EXTRACTION OF CONTAMINATED WATER-WET SOILS, SEDIMENTS, AND SLUDGES

[75] Inventors: Thomas C. Holcombe, Mountain Lakes; Theodore D. Trowbridge, Madison, both of N.J.; Charles T. Rawlinson, Richmond Hill, N.Y.

[73] Assignee: Hanover Research Corporation, East Hanover, N.J.

[21] Appl. No.: 115,480

[22] Filed: Sep. 3, 1993

[51] Int. Cl.$^6$ .................................................. B01D 11/04
[52] U.S. Cl. ......................... 210/634; 210/770; 210/806
[58] Field of Search ................................... 210/634, 712, 210/770, 806; 159/47.3; 34/9; 202/174; 203/14, 71

[56] References Cited

U.S. PATENT DOCUMENTS

| | | | |
|---|---|---|---|
| Re. 31,185 | 3/1983 | Greenfield et al. | 159/1 RW |
| 3,950,230 | 4/1976 | Greenfield et al. | 203/47 |
| 4,270,974 | 5/1981 | Greenfield et al. | 159/16 |
| 4,336,101 | 5/1982 | Greenfield et al. | 159/16 |
| 4,702,798 | 10/1987 | Bonanno | 159/47.1 |
| 4,801,384 | 1/1989 | Steiner | 210/634 |
| 4,869,825 | 9/1989 | Steiner | 210/634 |
| 5,055,196 | 10/1991 | Darian et al. | 210/638 |
| 5,076,895 | 12/1991 | Greenfield et al. | 203/10 |
| 5,256,251 | 10/1993 | Holcombe | 210/770 X |

OTHER PUBLICATIONS

Hall et al, "An Overview of Solvent Extraction Treatment Technologies", AIChE Summer Natl. Mtg., Phil. Pa., Aug. 22, 1989, Environmental Prog. vol. 9 No. 2.
Blank Z et al, "Leep–Low Energy Extraction Process", Applied Remediation Technology Inc., Randolph, New Jersey, 1968.
Engr. Bulletin: "Soil Washing Treatment" USEPA Office of Research and Development Cincinnati, OH, EPA 540/2–90/017, Sep. 1990.
Engr. Bulletin Solvent Extraction Treatment USEPA Office of Research and Development, Cin. OH, EPA/540/2–90/013, Sep. 1990.

*Primary Examiner*—Frank Spear
*Attorney, Agent, or Firm*—E. Lieberstein

[57] ABSTRACT

This invention is a continuous process combining water evaporation and solvent extraction of contaminated water-wet soil, sediment or sludge, including specifically, but not exclusively Petroleum Refinery "K" and "F" wastes as defined by the U.S. Environmental Protection Agency: K048—Dissolved air flotation (DAF) float; K049— Slop oil emulsion solids; K050—Heat exchanger bundle cleaning sludge; K051-API seaparator sludge; K052—Tank bottoms (leaded); F038—Petroleum refinery primary oil/water/solids separation sludge; F038—Petroleum refinery secondary (emulsified) oil/water/solids separation sludge, comprising the steps of (1) mixing water-wet soil, sediment, with a water-immiscible solvent and dehydrated or partially dehydrated solids from the feed, (2) feeding said mixture through a dehydration operation with concurrent solvent extraction of the contaminant or contaminants into the solvent, (3) separating the solids from the solvent, (4) mixing the separated solids with fresh solvent and dissolving the contaminant or contaminants into the solvent further, (5) repeating steps (3) and (4) as required, (6) separating the waste solids from the water-immiscible solvent, (7) separating the solvent from the contaminant or contaminants, and (8) recycling the water-immiscible solvent separated from the waste solids and the contaminant or contaminants in the continuous process.

20 Claims, 2 Drawing Sheets

PROCESS FOR DRYING AND SOLVENT EXTRACTION OF CONTAMINATED WATER-WET SOILS, SEDIMENTS, AND SLUDGES

BACKGROUND OF THE INVENTION

The present invention applies to a process for treating contaminated water-wet soils, sediments and sludges by evaporating the water present and extracting the solvent-soluble contaminants from the solids with a liquid solvent. In particular, the solvent-soluble contaminants in the water-wet soils, sediments, and sludges may be any number of solvent-soluble materials including hydrocarbons, PCB's, dioxins, chlorinated compounds including pesticides, herbicides, etc. and other solvent-soluble materials which in many circumstances may also be considered hazardous. The solids present in the soils, sediments and sludges are kept pumpable even after drying by being mixed with a fluidizing solvent which is insoluble or only slightly soluble in water.

PRIOR ART

Environmental concerns in recent years have emphasized contaminant identification and contaminant removal from contaminated soils, sludges and sediments. Many of the contaminants are toxic or otherwise hazardous to humans and animals and successful remediation of the matrices containing these contaminants have taken many forms. A number of technologies have been proposed and demonstrated for treatment of contaminated materials and differ according to the type of contaminant of concern, the matrix to which it is attached, and the applicable regulations under which the remediation is governed. In all cases described here the contaminant referred to may be considered hazardous or non-hazardous depending upon the applicable regulation but in all cases must be separated from the feed material of concern.

According to Blank, et al, among others, the technologies which may apply to soil, sludge and/or sediment remediation include incineration, bio-remediation, stabilization/fixation, chemical treatment, soil washing and solvent extraction. While each technology may be attractive for specific remediation objectives of certain matrices in certain locations, they all have disadvantages which prohibit their being the only best technology for remediation of all soil, sludge, and sediment matrices. Before discussing the specific prior art relevant to the present invention, which falls in the category of solvent extraction, the applicable concerns about the other technologies will be discussed. While the discussion which follows is addressed in general at problems with contaminated materials already in or on the ground, it also applies equally to U.S. Environmental Protection Agency (USEPA) Resource Conservation and Recovery Act (RCRA) products, like refinery waste sludges, which are being generated constantly by operating manufacturing facilities such as off refineries, etc. The present invention applies specifically, but not exclusively to Petroleum Refinery "K" and "F" wastes as defined as hazardous by the USEPA: K048—Dissolved air flotation (DAF) float; K049—Slop oil emulsion solids; K050—Heat exchanger bundle cleaning sludge; K051—API separator sludge; K052—Tank bottoms (leaded); F038—Petroleum refinery primary oil/water/solids separation sludge; F038—Petroleum refinery secondary (emulsified) oil/water/solids separation sludge.

Incineration technologies include those processes in which the contaminants are destroyed at high temperature, and may include simple combustion in a fixed or fluidized bed, plasma torch, infra-red source, and other equipment, can be suitable for hydrocarbons and other materials which may be oxidized at low temperature. However, with other materials such as chlorinated hydrocarbons, PCB's, etc., because of the very high destruction requirements, the process must be operated under severe conditions resulting in high investment and operating costs. In addition, some incineration processes may not be able to achieve the desired level of contaminant destruction and may also result in air or water emissions which are undesirable or require further expensive treatment. Furthermore, there may be significant public opposition to the siting of incinerators in certain areas so that even if the incinerator will potentially operate in an environmentally responsible manner the appropriate government permits for operation may not be issued because of possible continuing environmental concerns of the public.

Bio-remediation, in which the contaminants are broken down biologically, is attractive in some locations since it can be used in-situ such that excavation and refilling of the matrix is not required. Successful application of this technology can be very site specific in terms of both contaminant and underlying matrix. In addition, the existence of co-contaminants, such as heavy metals, may inhibit the desired biological action and render the process useless for a specific application.

The use of in-situ stabilization/fixation technology has the potential advantage of minimizing excavation at the contaminated site but may have other problems; the site may be restricted in it what it may be used for in the future, there is usually a volume increase (20–30%) due to redeposited material, and the long-term aging effects of the stabilized/solidified matrix are not well known which raises continuing potential liability issues.

Chemical treatment technology involves reacting the contaminant with a suitable reactant such that the contaminant is destroyed and the residual reaction product is a non-contaminant of the matrix. An example of this technology is the treating of PCB's and other aromatic halogenated compound-contaminated soils with alkaline metal hydroxide/polyethylene glycol (APEG) reagents. For in-situ applications, chemical treatment can be very dependent on matrix characteristics and other geological factors. Furthermore, because a significant excess of reagent must be used for in-situ operations to assure complete reaction of the contaminants, the amount of chemical reagent required becomes very costly. It is noted that chemical treatment of contaminants can be effective and economical once the contaminants are removed from the matrix and in concentrated form such that a great excess of reagent is not required to assure complete reaction. One of the features of solvent extraction technology and the present invention, in particular, is that the contaminants are recovered in a concentrated form such that further treatment, if required, is economically feasible.

Soil washing and solvent extraction technologies are ex-situ operations in which the soil, sludge, or sediment matrix is initially mixed with an excess of liquid such as water or solvent which may or may not contain certain other promoting agents (surfactants, emulsifiers, chelants, etc.). The result of this initial treatment is to mobilize the contaminant in some manner such that when the solids and liquid from the mixture are separated, the contaminant is concentrated in some respect which permits convenient disposal, destruction or further processing of the contaminant. In all cases of soil washing and solvent extraction, the product volume containing the contaminant is reduced from the original volume, which thereby minimizes the volume of contaminated material which must be further processed.

According to the USEPA in its Engineering Bulletin: "Soil Washing Treatment" (EPA/540/2-90/017), soil washing utilizes water to mechanically treat matrices ex-situ to remove contaminants in one of two ways: by dissolving or suspending them in water such that the contaminants can be further removed from or treated in the water, or by concentrating them by separation of the smaller particle fraction of the original matrix.

In order to dissolve or suspend the contaminants, very often surfactants, organic solvents, or chelants must be added to the water to achieve the desired separation. While soil washing may be successful in some cases, in other cases the required use of extraneous materials or the formation of emulsions with organics may interfere with the downstream treatment of the water stream which contains the contaminants. Contaminant removal by solids separation is based on the finding that contaminants tend to bind chemically and/or physically to the smallest solids present in the matrix, the clay and silt particles. Thus, some soil washing technologies are based on facilitating the detaching of the smaller clay and silt particles from larger sand and gravel particles and then separating the clay and silt containing the contaminants from the sand and gravel.

The EPA concluded that although soil washing may be good for some remediation situations, when there are significant amounts of silt and clay size particles present, soil washing should not be used as a stand-alone treatment. Besides the shortcomings mentioned above, it should be noted that extremely fine solids may not only contain high quantities of contaminants but also may not separate from a wastewater stream resulting from soil washing and thereby interfere with the effective operation of downstream water-treating equipment.

The present invention is an improved solvent extraction technology whose advantages will become apparent as other solvent extraction technologies are described. According to the USEPA in its Engineering Bulletin: "Solvent Extraction Treatment" (EPA/540/2-90/013), solvent extraction typically uses an organic solvent (instead of water as used in soil washing) to treat soils, sludges and sediments containing primarily organic contaminants such as PCB's, volatile organic compounds (VOC's), halogenated solvents and compounds and petroleum wastes. This technology is generally not effective for extracting inorganics (acids, bases, salts, heavy metals, etc.), although the inorganics do not usually have a detrimental effect on the extraction of the organics. It is noted that sometimes the inorganics may exhibit a beneficial effect by converting an organic contaminant to a less toxic form. Solvent extraction has been shown to be applicable for the separation of organic contaminants in paint wastes, synthetic rubber process wastes, coal tar wastes, drilling muds, wood treating wastes, API separator sludges, pesticide/insecticide wastes, and petroleum refinery wastes including Refinery "K" and "F" wastes as described previously. In a recent paper by Hall, et at, a number of commercial or developmental solvent extraction processes for waste remediation are available, some of which are described below.

One commercially available process utilizes critical fluids or liquified gases as solvents to separate and recover oils from refinery sludges and to extract hazardous organic compounds batchwise from wastewater, soils, sludges and sediments. A critical fluid is a fluid which is utilized above its thermodynamic critical temperature and pressure such that there is no distinction between the liquid and gas phases. This process uses carbon dioxide as a critical fluid and propane and butane as liquified gas solvents for their technology. High extraction efficiencies are claimed for these materials in the process which must operate at necessarily high pressures and which thereby adds expense and complicates the operation of the process. The extracted contaminants are recovered by vaporizing the solvent into a vessel operating at a lower pressure than the extractor. The fluid is then recompressed into the critical region and/or liquified as solvent and returned to the extraction process. The recovered non-volatile contaminants which have been separated can be processed further or destroyed. Besides the complications of high pressure operation, most of the solvents used for hydrocarbon extraction are highly flammable materials, such as propane and butane.

Another commercially available processs utilizes the unique properties of triethylamine (TEA) as an extraction agent to separate municipal wastewater sludges, petroleum refinery wastes, PCB-contaminated soils and sediments and oily hazardous wastes into solids, water and oils containing contaminants. TEA has the property of inverse miscibility with water in that it is miscible with water at low temperatures but immiscible with water at temperatures above about 65° F. In this process, the waste is contacted batchwise with TEA at low temperatures and the water and oil present dissolve in the TEA. After solids separation, the TEA is heated to above 65° F. and the water separates from the TEA/oil mixture. The TEA is flash evaporated away from the oil contaminants and recovered for further use in the process. The recovered contaminants which have been separated can be processed further or destroyed. A significant process expense is the need for a refrigeration system. TEA is a corrosive solvent and potentially explosive.

Additional solvent extraction processes which are promoted as suitable for soil, sludge and sediment remediation are:

1. The use of propane and reformate as solvents is referenced in a paper by Poche, et al. Liquid propane is flammable and must be used at high pressures. In addition, the use of dual solvents complicates the process operation.
2. Another process uses Freon 113 and methanol as solvents. Use of Freon 113 presents an environmental issue since it contributes to problems with the earth's ozone layer.
3. Still another process uses a kerosene-water mixture as solvent to remove PCB's which could present operating difficulties if water/kerosene emulsions were formed.
4. And another process uses a variety of non-toxic hydrophobic and/or hydrophilic solvents in site specific blends for specific contaminants.

In all of the above referenced processes any water in the soil, sludge or sediment matrix, plus any water which is added to the feed to facilitate processing, remains with the extracting mixture during the extraction procedure. As a consequence, the water can form emulsions with the solvents present and inhibit the handling of the extracting mixture, as well as inhibit the extraction itself for certain contaminants. The water can be difficult to separate from the mixture and may require extensive further treatment before it can be discharged to the environment. The present invention overcomes these difficulties by combining water evaporation with solvent extraction.

It has been shown in attempting to solvent extract some contaminants, such as PCB's, that the presence of water in the extracting medium inhibits the extraction of the contaminant into the solvent. This is readily apparent from the data below:

| Feed Sludge | 100% Solids | 58% Solids/42% Water | |
|---|---|---|---|
| Solvent | Kerosene | Kerosene | Acetone |
| | PCB Concentration on Solids, ppm | | |
| Initial | 36,268 | 36,268 | 33,641 |
| After 4 Extractions | 251 | 30,873 | 11 |
| Soil Moisture | 40% Moisture | 10% Moisture | Dry Soil |
| | PCB Concentration, ppm | | |
| Initial | 28 | 28 | 50 |
| After 1 Extraction | 25 | 18 | 10 |
| After 2 Extractions | 25 | 17.5 | 0 |

Two processes are offered which are designed to overcome this phenomenon. One process as taught in U.S. Pat. No. 5,055,196 utilizes a hydrocarbon solvent slightly soluble in water and having an atmospheric boiling point below the boiling point of water to which is added a comminuting and extracting surfactant. The surfactant is partially or totally water soluble and forms a bridge across the water barrier between the surface of the solid on which the contaminant is adhered and the solvent in which it is soluble. It is perceived that the water barrier virtually encapsulates the contaminant as it adheres to the solid surface and prevents it from passing into the solvent if the comminuting surfactant is not present. The shortcomings to this process include the use of flammable solvents and expensive surfactants.

Another process as taught in U.S. Pat. Nos. 4,801,384 and 4,869,825 utilizes a water-soluble solvent such as methanol, acetone, or isopropanol, etc. to extract the contaminant from the water-containing matrix by solubilizing the water. Subsequently, the now separated (from solids) solvent/water/contaminant mixture is contacted with an immiscible solvent such as kerosene which extracts the contaminant from this liquid mixture. The contaminant may be concentrated and separated by vaporizing the kerosene away from the contaminant. Here, again, the use of flammable solvents (flash point below 140° F.) requires special transportation, storage and handling requirements relative to the use of a higher flash point material.

SUMMARY OF THE INVENTION

The process of the present invention broadly comprises a combination of water evaporation and solvent extraction of contaminated water-wet soil, sediment or sludge which overcomes the disadvantages of the processes for treating these materials according to the prior art. The process comprises the steps of (a) adding contaminated water-wet soil, sediment, or sludge to a recirculating stream of water-immiscible solvent containing feed solids which have already been dehydrated or partially alehydrated to avoid an increase in viscosity due to clumping, thickening, or the formation of an emulsion and the accompanying fouling of the heat transfer surfaces of the dehydrating evaporator as taught in U.S. Pat. No. Re. 31,185, wherein all of the water-immiscible solvent has an atmospheric boiling point above that of water and below 550° F. and a viscosity of less than 500 centipoise, (b) passing the slurry through an evaporator and removing at least 95% of the water and dissolving some of the contaminant into the liquid solvent, (c) separating the majority of solids from the majority of the liquid solvent, (d) reslurrying the separated solids with additional solvent to dissolve more of the contaminant into the solvent, (e) repeating steps (c) and (d) as required to remove at least 90% of the incoming contaminant, (f) performing a final separation of the waste solids from the solvent, (g) separating the solvent from the contaminants, and (h) recycling the recovered solvent separated from the waste solids in the continuous process.

A second version of the process which is particularly applicable to oily sludges such as refinery wastes, comprises the steps of (a) adding contaminated water-wet sludge to a recirculating stream of water-immiscible oil indigenous to the sludge, (b) passing the slurry through an evaporator and removing substantially all of the water, (c) separating the majority of solids from the majority of the indigenous oil and recycling the solids-free indigenous oil to the process as described in (a) above, (d) reslurrying the separated solids with a water-immiscible solvent all of which has an atmospheric boiling point above that of water and below and 550° F. and a viscosity of less than 500 centipoise, and extracting the contaminant into the solvent using a gravity-settling counter-current solids/solvent contactor column or, (e) separating the majority of solids from the majority of the solvent and reslurrying and separating as required to accomplish the required level of decontamination, (f) performing a final separation of the waste solids from the solvent, (g) separating the solvent from the contaminants, and (h) recycling the recovered solvent to step (d) above, in the continuous process. The reslurrying and separation steps described in (d) and (e) above may be performed by a Karr Column made by Otto York Company, or a rotary vacuum or pressure filter or by a perforated basket centrifuge or similar solvent extraction equipment. In another version of the process the water-immiscible solvent in (d) above will have a boiling point above 120° F. and below 550° F. and a viscosity of less than 500 centipoise.

In other versions of the process of the invention the solvent is not separated from the contaminants but is returned to another processing facility such as an oil refinery which furnishes the fresh solvent and in which both the solvent and contained contaminants are further processed and recovered.

The overall advantages of the use of a combination of water evaporation and solvent extraction over those processes described according to the prior art include: (a) water removal avoids the formation of water/hydrocarbon emulsions which hinder process operability; (b) water removal removes the barriers to diffusion and permits more efficient extraction of contaminants into the solvent; (c) the solvent utilized has a higher flash point than many other processes thereby permitting safer operations; (d) the solvent may be a "food-grade" material which minimizes toxicity concerns; (e) the solvent permits operation at mild conditions of temperature and pressure and; (f) the waste feed is reduced in volume and separated into its component pans: clean water which may be treated in a conventional water treatment plant; dry solvent-soluble contaminants which may be reused in the upstream processes; and clean solids which are often non-hazardous and may be disposed of less expensively that hazardous waste. Specific advantages of each embodiment are presented with the detailed description of the embodiments.

DETAILED DESCRIPTION OF THE INVENTION

Figure 1:
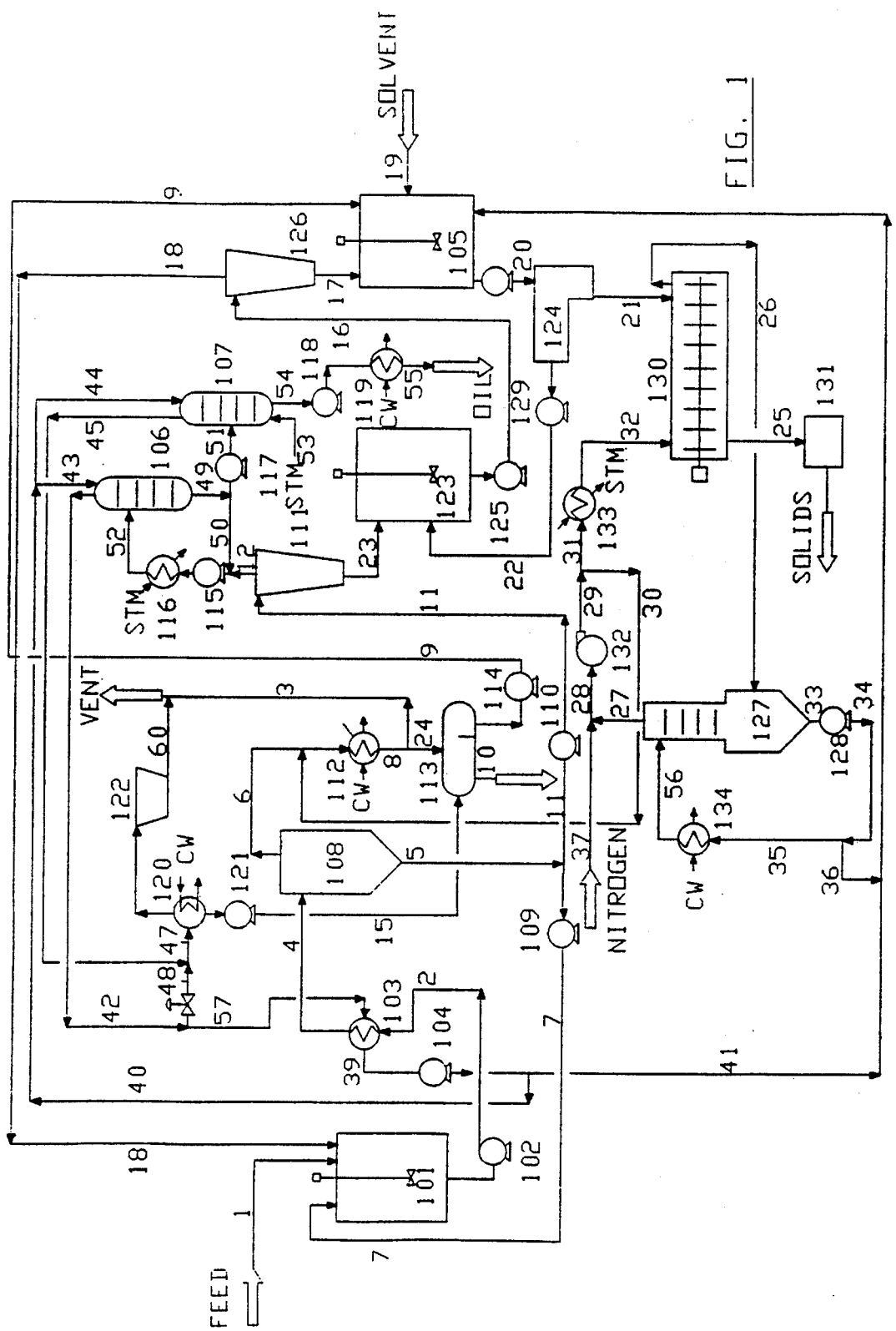
FIG. 1 is a schematic representation of the process useful in practicing the teachings of the invention having the feed suspended in a solvent and having one water evaporation stage and a total of three solvent extraction stages in separate pieces of equipment, one of which is in combination with the water evaporation stage.

As applied to treatment of a contaminated water-wet soil, sediment or sludge, the present invention is a combination of water evaporation and solvent extraction which overcomes the disadvantages of the processes for treating these materials according to the prior art. The advantages of the present invention will be apparent from the following description of a commercial design according to the preferred embodiments.

In one embodiment of the invention, contaminated water-wet soil, sediment or sludge is added to a recirculating stream of water-immiscible light fluidizing solvent containing feed solids which have already been dehydrated or partially alehydrated. By light fluidizing solvent is meant a liquid that is water-immiscible, or nearly so, and relatively fluid and relatively volatile and all of which has an atmospheric boiling point above that of water and below 550° F. and a viscosity of less than 500 centipoise. The total circulating stream is heated to about 250° F. and slightly above atmospheric pressure such that enough heat is supplied to vaporize the water present in the feed. The hot stream is now flashed to atmospheric pressure such that the water vapor and some solvent vapor is separated from the bulk of the circulating slurry stream. The water and solvent vapors which are both free of solids are condensed into liquids and processed further as required.

In addition to drying the solids by water evaporation in the first stage, contaminants associated with the solids which are soluble in the solvent are extracted from the solids and pass into the solvent. After the water evaporation and extraction in the first stage, the solids are separated from the majority of the solvent present in the slurry by centrifuging or other means. After this separation stage, the solids are reslurried in the second stage in cleaner solvent such that any contaminant remaining with the solids is further extracted into the solvent in this second stage of the extraction. No slurry cooling is provided so that the extraction temperature will be between 200° F. and 250° F. in the second stage.

As described in this embodiment, the solids are separated from the majority of the solvent a second time and the solids reslurried in fresh solvent a third time such that any contaminant still remaining with the solids is further extracted into the solvent in this third stage of the extraction. Additional stages of solvent extraction are possible depending on the degree to which the contaminant must be extracted from the solids. No slurry cooling is provided so that the extraction temperature will be between 200° F. and 250° F. in the third and any subsequent stages.

After the final stage of extraction, the third stage in this embodiment, the slurry is fed to a solid-liquid separation unit such as, but not necessarily, a centrifuge, where the final solid-liquid separation takes place. The means for doing this separation is dependent on the solids properties, slurry characteristics, etc. but the device will be chosen to separate the most solids with as small an amount of liquid solvent as possible, which in most cases will be a centrifuge.

The centrifuge cake flows to a desolventizer where the solvent remaining on the solids is vaporized in a hot recirculating stream of inert gas at temperatures between 300° F. and 400° F. The dry solids, freed of solvent-soluble contaminants and solvent, are cooled and disposed of in a proper manner. The solvent vaporized from the solids is recovered from the recirculating inert gas stream by cooling to about 200° F. The recovered solvent is returned to the extraction stages while the inert gas is reheated for recycle to the desolventizer.

The solvent flow is counter-current to the solids flow through the unit such that the cleanest solvent containing none or the minimum amount of contaminant is added to the third extraction stage in this embodiment, or the last extraction stage in the general case. The next cleanest or minimally contaminated solvent is the centrate from the centrifuge or other separation device after the third stage which is mixed with the solids in the second stage extraction section. The overflow solvent containing more contaminant from the second stage solid-liquid separator is mixed with the recirculating water-free solids and the feed water-wet contaminated solids in the first stage.

The overflow solvent from the separator after the first stage contains all the contaminant extracted from the solids in the three stages of extraction and hence has the highest concentration of contaminant in solvent. This contaminant-containing solvent stream is now fed to a distillation section where the solvent is vaporized, condensed and separated as clean solvent for recycle to the third extraction stage. The contaminant and any remaining solvent required for ease of handling of the contaminant stream is cooled and removed from the system for further processing. In some cases this material may be burned in a boiler where the steam required for the process is generated.

In one version of the process of the present invention the solvent is not separated from the contaminants by distillation but is returned to another processing facility such as an oil refinery which furnishes the fresh solvent and in which both the solvent and contained contaminants are further processed and recovered.

By adding the contaminated water-wet feed to a recirculating slurry stream containing solids containing less water than the feed, difficulties with emulsion formation, gummy solids formation and high viscosity slurries are avoided. These problems and other solutions thereto are discussed in U.S. Pat. No. Re. 31,185, the disclosures of which are incorporated by reference. In addition, by suspending contaminated water-wet solids in a solvent and circulating them through an evaporator, the solids are well suspended and the presence of the water-immiscible fluidizing solvent maintains good heat transfer without the scaling, deterioration, and corrosion of heat transfer surfaces which would be experienced if only water and solids were present.

Processing of contaminated wastes in the manner described permits a continuous operation with no water required to be added for processing nor any bulk separation of oil, solvent, and water which would complicated the performance of the equipment.

Furthermore, according to the present invention there is no need to add an expensive surfactant to the circulating slurry to maintain a good suspension of solids in the solvent. The use and benefits of surfactants are discussed in U.S. Pat. No. 4,702,798, the disclosures of which are incorporated by reference. In addition, there will be no surfactant which could be a source of contamination remaining on the solid product.

There are a number of advantages for the present invention where a solvent is used that has a higher boiling point than water. The solvent extraction of the contaminant from the solids can take place at higher temperatures and therefore at a faster rate than applications using the prior art. The solvent may be a relatively inexpensive refined paraffinic or other type hydrocarbon. In addition, the flammability of the solvent is lower than those used in other processes, making it safer to handle for transportation and storage. In addition, no refrigeration or higher pressures are required to handle the more volatile solvents required using the prior art.

Finally, it has been determined that the extraction of the contaminants from a water-wet soil, sediment, or sludge matrix is more efficient when water is removed than when water is present. This is due to the fact that removal of water destroys many of the barriers to diffusion of the contaminant into the solvent; vaporization of the water sorbed in the solids steam strips the contaminant away from the solid particle; and, mass transfer is improved with the particle agitation caused by the boiling water in the solids, all of which result in a lower organic contaminant on the final product.

In another preferred embodiment of the invention, contaminated water-wet soil, sediment or, in particular, sludge from petroleum refining operations is added to a recirculating stream composed of hydrocarbon oil which is indigenous to the soil, sediment or sludge and feed solids which are dehydrated or partially dehydrated. By oil indigenous to the sludge is meant a liquid that is water-immiscible or nearly so and relatively fluid which has been separated from the sludge by, for example, centrifuging. Specifically, the use of this embodiment is particularly advantageous when the contaminated feed to the process contains the same amount or more indigenous oil than solids. From operating experience, it has been found that when separating most solids with a centrifuge from the recirculating solids/indigenous oil slurry, approximately the same amount of indigenous oil and solids are removed in the centrifuge cake for further solvent extraction. Thus, if there is as much indigenous oil in the feed as there are solids, there will be no need for a make-up oil to be provided. For process start-up purposes and or other reasons this recirculating oil may be oil extraneous to the process but having the same or similar desired physical and chemical properties as the oil indigenous to the sludge.

The total circulating stream now containing water-wet solids is heated to about 250° F. and slightly above atmospheric pressure such that enough heat is supplied to vaporize the water present in the slurry, which was introduced with the feed. The hot stream is now flashed to atmospheric pressure such that the water vapor and some indigenous oil vapor is separated from the bulk of the circulating slurry stream. The water and oil vapors which are both free of solids are condensed into liquids and processed further as required.

After the water evaporation, the solids are separated from the majority of the circulating indigenous oil present in the slurry by centrifuging or other means. Indigenous oil separated from the solids in the centrifuge are recovered or disposed of appropriately. After this separation the solids are reslurried with a light solvent all of which has an atmospheric boiling point above that of water and below 550° F. and a viscosity of less than 500 centipoise, or fed directly to the upper pan of gravity settling counter-current solids/solvent contactor into which a solvent with these properties is fed in the lower part. Examples of this kind of equipment are a disk and doughnut column or a Karr Reciprocating Plate Extraction Column made by Otto H. York Company, Inc.

The solids pass countercurrently to the extracting solvent in the solvent extraction equipment such that many stages of solvent extraction may take place before the solids exit the bottom of the equipment and the solvent containing the indigenous oil and contaminants exit at the top of the equipment. The solids containing some solvent leave the bottom of the solvent extraction equipment and pass to a solid-liquid separation unit such as, but not necessarily, a centrifuge, where the final solid-liquid separation takes place. The means for doing this separation is dependent on the solids/liquid properties, etc., and the device will be chosen to separate the most solids with as small an amount of liquid solvent as possible, which in most cases will be a centrifuge.

In another preferred embodiment of the invention the gravity settling counter-current solids/solvent contactor and the centrifuge are replaced with a rotary pressure or vacuum filter or a perforated basket centrifuge in which multi-stage counter-current washing and solvent extraction may be performed. Examples of this kind of equipment are a Bird-Young Rotary Filter made by Bird Machine Company and Quadramatic III batch-type centrifuge made by The Western States Machine Company.

For this particular embodiment of the invention, in certain circumstances it will be advantageous to reslurry the separated solids with a water immiscible solvent all of which has an atmospheric boiling point above 120° F. and below 550° F. and a viscosity of less than 500 centipoise, and extracting the contaminant into the solvent using a gravity-settling counter-current solids/solvent contactor column or a rotary pressure or vacuum filter or a perforated basket centrifuge.

The centrifuge cake or filter cake flows to a desolventizer where the solvent remaining on the solids is vaporized in a recirculating stream of inert gas at temperatures between 300° F. and 400° F. The dry solids, freed of solvent-soluble contaminants and solvent, are cooled and disposed of in a proper manner. The solvent vaporized from the solids is recovered from the recirculating inert gas stream by cooling to about 200° F. The recovered solvent is returned to the extraction equipment, while the inert gas is reheated for recycle to the desolventizer.

The overflow solvent from the solvent extractor contains all the contaminant extracted from the solids in the extractor and this contaminant-containing solvent stream is now fed to a distillation section where the solvent is vaporized, condensed and separated as clean solvent for recycle. The contaminant and any remaining solvent required for ease of handling of the contaminant stream is cooled and removed from the system for further processing. In some cases this material may be burned in a boiler where the steam required for the process is generated.

In another version of the process of the present invention, the solvent is not separated from the contaminants by distillation but is returned to another processing facility such as an off refinery which furnishes the fresh solvent and in which both the solvent and contained contaminants are further processed and recovered.

By adding the water-wet feed to a recirculating slurry stream containing solids with less water than the feed, difficulties with emulsion formation, gummy solids formation and creation of high viscosity slurries are avoided. These problems and other solutions thereto are discussed in U.S. Pat. No. Re. 31,185, the disclosures of which are incorporated by reference. In addition, by suspending water-wet solids in an indigenous oil and circulating them through an evaporator, the solids are well suspended and the presence of the water-immiscible fluidizing indigenous oil maintains good heat transfer without the scaling and deterioration of heat transfer surfaces which would be experienced if only water and solids were present.

Furthermore, according to the present invention, there is no need to add an expensive surfactant to the circulating slurry to maintain the good suspension of solids in the solvent. The use and benefits of surfactants are discussed in U.S. Pat. No. 4,702,798, the disclosures of which are incorporated by reference. In addition, there will be no surfactant which could be a source of contamination remaining on the solid product.

It is sometimes advantageous to use an oil indigenous to the waste is used during water evaporation, rather than an external solvent, because the majority of the indigenous off will be separated before the solids are contacted with the solvent, thus less solvent will be required to achieve the desired level of extraction.

Other advantages of the use of solvent extraction listed in the first embodiment which are applicable to these embodiments are incorporated herein.

Figure 2:
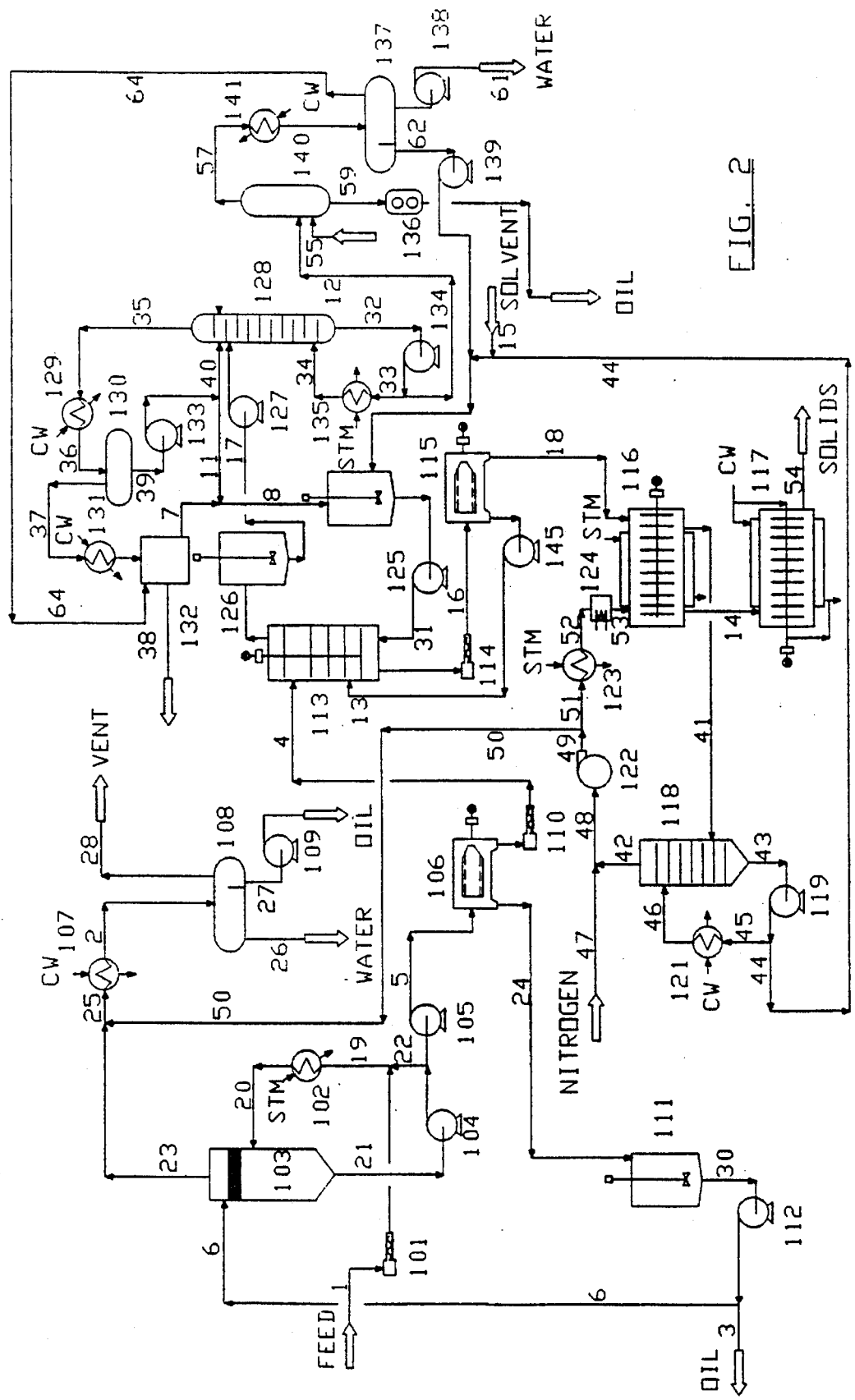
FIG. 2 is a schematic representation of the process useful in practicing the invention having the feed suspended in indigenous oil and having one water evaporation stage and one piece of equipment in which gravity settling counter-current multi-stage extraction contacting takes place.

While the present invention has been illustrated in FIGS. 1 and 2 by examples involving a combination integrating one evaporation/extraction stage followed by two extraction stages or a single multi-stage extraction unit, other configuration variations are possible. For example, the there may be more than three extraction stages in the illustration according to FIG. 1. Also, a single multi-stage extraction unit like that according to FIG. 2 may be used, instead of the multiple stages of extraction, for the application shown in FIG. 1. Conversely, multiple stages of extraction like those in the illustration according to FIG. 1 may be incorporated into the invention illustrated in FIG. 2.

Another variation would include water evaporation in more than one stage, particularly in the case where there are relatively high water contents, for example, over 30–40 wt % in the feed matrix.

Still another variation would include water evaporation in a stage or stages after the first extraction stage, with no water being evaporated in the first extraction stage.

Still other variations when water evaporation was required in more than one step would include using an energy efficient multi-effect evaporation system or mechanical vapor recompression for energy efficient evaporation. Multi-effect evaporation for a system comparable to this invention is described in U.S. Pat. No. 4,270,974 and a mechanical vapor recompression system is described in U.S. Pat. No. 5,076,895, the disclosures of which are incorporated by reference.

Still other variations would include any of the above variations, but in which a feed fluidizing tank would not be required and the feed matrix would be added directly to the recirculating stream in the water evaporation.

Still other variations would include treatment of water-wet solids matrices contaminated with light organic materials. By light organic materials is meant substances which have atmospheric boiling points lower than that of water and which are insoluble or nearly insoluble in water. If light organic materials are present, they would be steam stripped from the solids and recirculating slurry in the evaporation stage of the present invention and would condense along with the water. Since they would be insoluble in water, they could easily be separated from the water and clean water would be produced by the process. In all variations, the water would be solids-free and suitable for easy treating in other facilities before discharge to the environment.

Still other variations would include the use of a hydrocarbon solvent on a "once-through solvent" basis in which the solvent would be received from an adjacent processing facility, such as an oil refinery which produced a stream having the desired solvent properties for this invention, and after extraction of the contaminants from the solids into the solvent, the newly-contaminated solvent would be returned to the processing facility in which the contaminants and solvent would be separated and/or otherwise utilized.

As described earlier, the solvent used in the present inventions must have an atmospheric boiling point above that of water and 550° F. and a viscosity of less than 500 centipoise. For the embodiment of the invention shown in FIG. 2, in certain circumstances it will be advantageous to reslurry the separated solids with a water-immiscible solvent all of which has an atmospheric boiling point above 120° F. and below 550° F. and a viscosity of less than 500 centipoise. One preferred class of solvents is light hydrocarbon oil. The light hydrocarbon oil may be normal paraffinic, isoparaffinic, aromatic, olefinic, naphthenic, or a combination thereof. Examples of suitable light hydrocarbon oils are $C_6$ to $C_{16}$ hydrocarbons and mixtures. Certain commercial grades of light hydrocarbon oils, such as Exxon's "Isopar" solvents, may be preferred because they are non-toxic and have been approved by the Food and Drug Administration for processing food products. Another class of suitable solvents is water-immiscible fatty alcohols, such as n-hexyl alcohol, n-heptyl alcohol, isoheptyl alcohol, up to $C_{14}$ alcohol. Fatty acids such as caprole acid, caprylic acid and capric acid as well as the methyl and ethyl esters of those acids may also be used as a solvent. Surfactants may also be added to the solvents to improve their extractive abilities for certain contaminants.

As shown in FIG. 1, process feed (a contaminated water-wet soil, sediment or sludge) enters the process through input line 1 and is fed to fluidizing tank TK-101 for mixing with solvent supplied through line 18 and a slurry of solvent and feed solids which have been dehydrated or partially dehydrated and recycled through line 7. Pump P-101 moves the resulting slurry mixture of solvent, feed and solids from tank TK-101 through line 2 into the tube side of heat exchanger E-101. In the heat exchanger all or nearly all of the water added to the system with the feed plus a portion of the solvent is vaporized in this combination evaporation and first solvent extraction stage. A large quantity of the contaminant present in the feed is extracted into the solvent during this step. This stage is typically operated at about atmospheric pressure and between 200° F. and 270° F. Heat exchanger E-101 is heated on the shell side by condensing solvent vapor from line 42 and through line 57 which is at a temperature higher than the temperature of the slurry on the tube side, typically 20° F. to 100° F. higher. Condensed solvent from the shell side of heat exchanger E-101 is conducted through line 39 to pump P-111. Pump P-111 is used to pump solvent through line 41 to tank TK-103 where it is used in the third stage extraction and through line 40 to lines 43 and 44 where it is used as reflux for solvent recovery section towers T-102 and T-103.

The slurry mixture and evaporated water leave heat exchanger E-101 through line 4 and enter vapor-slurry separator T-101 where the vapor is separated and forming a dry solids slurry. The dry solids slurry is pumped out of vapor-slurry separator T-101 through line 5 using pumps P-102 and P-109. Most of the dry solids slurry passes through pump P-102 and line 7 and mixes with process feed in fluidizing tank TK-101. The remaining dry solids slurry passes through pump P-109 and line 11 and feeds cyclone M-101 and the second extraction stage.

The vapor from the vapor-slurry separator T-101 in line 6 mixes with vapor from other pans of the process (through line 30) and the combined vapor passes into condenser E-102 where the water and solvent vapors are condensed. The mixed condensate of water and solvent leaves condenser E-102 through lines 8 and 24 and passes into solvent-water separator TK-104. The uncondensed vapor from condenser E-102 exits the system through vent line 3. Water separated in the solvent-water separator TK-104 is sent through line 10 for disposal while the clean condensed solvent is pumped with pump P-108 through line 9 to third stage extraction tank TK-103.

The dry solids slurry from the vapor-slurry separator T-101 passes through pump P-109 and line 11 into liquid cyclone separator M-101 in which typically more than 90 percent of the solids in the slurry and less than 20 percent of the solvent are separated in the underflow through line 23 with the remainder of the solids and solvent leaving in the overflow line 12.

The overflow from cyclone M-101 in line 12 which contains primarily solvent but also the majority of the contaminant present in the feed as well as some solids not removed by the cyclone is joined by recirculating solvent from line 50 from the bottom of the solvent still. The combined streams are pumped by pump P-112 through the tube side of heat exchanger E-103 in which the liquid stream is heated to in excess of about 350° F. by condensing steam on the shell side of E-103. The heated stream then passes through line 52 to solvent still T-102 which is operated at below atmospheric pressure, typically between 3 and 8 pounds per square inch absolute pressure. It is the purpose of the solvent still T-102 to vaporize the bulk of the solvent entering it via stream 52 and to separate it from the contaminant and the remaining solvent by distillation. To aid in this separation by fractionation, a reflux of pure solvent is provided through line 43 to the top of the still. The unvaporized solvent plus contaminant pass downward through the still and exit the still through line 49. The vapors from the top of the still pass through line 42 and enter heat exchanger E-101 where they are condensed to provide the heat to E-101 as described above.

The liquid solvent plus contaminant exits the bottom of the solvent still T-102 through line 49 which divides into stream 50 which combines with stream 12 and line 51 which is fed by pump P-113 and enters solvent stripper T-104 which also operates at between 3 and 8 pounds per square inch absolute pressure. In T-104 the remaining solvent is removed from the contaminant so as to give the correct solvent content in the contaminant to provide ease of handling for further processing. To achieve this, live steam is injected into the bottom of the stripper vessel through line 53 and pure solvent reflux is added to the top of the vessel through line 44. The concentrated contaminant stream exits T-104 with the desired solvent level through line 54 and is pumped with pump P-103 through cooling water exchanger E-104 and off the battery limits through line 55.

The vapors from the solvent stripper T-104 exit the vessel through the top in line 45 and combine with part of the vapors from T-102 in line 48 into line 47 which passes into heat exchanger E-105 where the vapors are cooled and condensed with indirect cooling water cooling. The liquid condensate containing both solvent and water from E-105 is pumped with pump P-107 through line 15 to solvent/water separator TK-104 where the stream divides into its solvent and water components.

In the version of this invention denoted as the "once-through solvent" version line 12 which contains primarily solvent but also the majority of the contaminant present in the feed is directed to another processing facility such as an oil refinery. In this case, equipment designated P-112, E-103, T-102, P-113, T-104, P-103, E-104 and connected pipelines are not required. In this case also, the heat supplied to E-101 via line 42 is as steam from a boiler instead of the solvent vapor from T-102.

The vapors from E-105 enter vacuum system M-106 which maintains the vacuum on E-105, T-104, E-101 (shell side), and T-102 and exit through vent line 60 to vent line 3 from E-102 and the atmosphere.

The underflow cake from cyclone M-101 flows through line 23 into the second extraction stage tank TK-102 where it is combined with solvent from line 22 carrying the centrate from centrifuge M-103 which processes the slurry after the third stage extraction. The cake and solvent are thoroughly mixed in the second stage extraction tank TK-102. The temperature in this vessel is typically 200°–250° F. The product slurry is then pumped with pump P-104 through line 16 to cyclone M-102 in which typically more than 90 percent of the solids and the slurry and less than 20 percent of the solvent are separated in the underflow through line 17 with the remainder of the solids and solvent leaving in the overflow line 18 which flows to the fluidizing tank TK-101.

The underflow cake from cyclone M-102 flows through line 17 into the third extraction stage tank TK-103 where it is combined with condensed solvent from the shell side of E-101 pumped via P-111 through line 41, from TK-104 pumped via P-108 via line 9, and from T-103 pumped via pump P-110 through lines 34 and 36 into line 41. Fresh solvent also enters TK-103 via process make-up line 19. The cake and solvent are thoroughly mixed in the third stage extraction tank TK-103. The temperature in this vessel is typically 200° F.–250° F. The product slurry is then pumped with pump P-105 through line 20 into centrifuge M-103.

Centrate removed by centrifuge M-103 passes though P-106 into line 22 and into second stage extraction tank T-102.

Solids cake from centrifuge M-103 passes into desolventizer M-105 through line 21. The design of a solids desolventizer can vary considerably from the present example and one example is described in U.S. Pat. No. 4,518,458 the disclosures of which are incorporated by reference. This example of desolventizer consists of an externally heated vessel in which the solids are slowly turned and pushed with a rotating impeller and an inert gas such as nitrogen is heated and recirculated through the vessel. On FIG. 1 the solids cake enters the desolventizer M-105 through line 21 and passes down M-105 wherein the solvent is vaporized by a stream of inert gas entering through line 32. The desolventizer operates at about 350° F. and about atmospheric pressure. The substantially solvent free solids leave M-105 through line 25 at about 350° F. and are cooled in a solids cooler E-108 and leave the battery limits as solids product at ambient temperature.

The solvent laden inert gas exits M-105 at about 300° F. through line 28 and enters a scrubber T-103 where it is washed counter-currently with cooled solvent at about 150° F. or lower entering through line 56. Solvent removed from the solids in M-105 is condensed out of the solvent laden inert gas and exits T-103 with the scrubbing solvent through line 33. The scrubbing solvent passes through pump P-110 and exits in line 34 which splits into lines 35 and 36. Line 36 carries the excess condensed solvent to line 41 and to the third stage extraction tank TK-103. Line 35 carries the circulating solvent to cooler E-107 where it is cooled with water and then to line 56 and into scrubber T-103.

The cooled inert gas containing some solvent vapor exits the top of scrubber T-103 through line 27 and is joined by make-up nitrogen through line 37 into line 28 which in turn enters blower M-104. The compressed gas exits blower M-104 at about 200° F. through line 29 which splits into lines 30 and 31. Line 30 carries purged excess gas and combines with line 6 and enters condenser E-102. The inert gas in line 31 enters heater E-106 where the temperature is raised to about 350° F. The heated gas then enters the desolventizer M-105 through line 32.

In the embodiment shown in FIG. 2, process feed (a contaminated water-wet soil, sediment or sludge) enters the process through pump P-101 and input line 1 and is combined with line 22 where it mixes with oil indigenous to the feed and feed solids which have been dehydrated or partially dehydrated. The resulting slurry mixture of indigenous oil, feed and solids passes through line 19 and into the tube side of heat exchanger E-101. In the heat exchanger all or nearly all of the water added to the system with the feed plus low boiling portions of the indigenous oil is vaporized. This stage is typically operated at about atmospheric pressure and between 200° and 270° F. Heat exchanger E-101 is heated on the shell side by condensing steam is at a temperature higher than the temperature of the slurry on the tube side, typically 20° F. to 100° F. higher.

The slurry and evaporated water leave heat exchanger E-101 through line 20 and enter vapor-slurry separator T-101 where the vapor is separated from the slurry and enters line 23. The slurry is pumped out of vapor-slurry separator T-101 through line 21 using pump P-102. Most of the slurry enters line 22 where it mixes with the feed from pump 101. The remaining substantially water-free slurry passes through pump P-110 and line 5 and feeds evaporator product centrifuge M-102. The vapor from the vapor-slurry separator T-101 in line 23 mixes with vapor from other parts of the process (through line 50) and the combined vapor passes into condenser E-102 where the water and light oil vapors are condensed. The mixed condensate of water and light oil leaves condenser E-102 through line 2 and passes into oil-water separator D-101. The uncondensed vapor from condenser E-102 exits the D-101 through vent line 28. Water separated in the oil-water separator D-101 is sent through line 26 for disposal while the light oil product exits through line 27 and is pumped for disposal with pump P-109.

The product slurry from P-110 and line 5 enters the evaporator product centrifuge M-102 in which typically more than 95+ percent of the solids in the slurry and less than 20 percent of the indigenous oil are separated in the cake through extractor feed pump P-103 and line 4 with the remainder of the indigenous off and solids leaving as centrate in line 24.

The centrate from centrifuge M-102 in line 24 which contains primarily indigenous oil as well as some solids not removed by the centrifuge flows to the centrate tank TK-101. The recovered indigenous oil leaves TK-101 via line 30 and enters centrate pump P-107 with which it is pumped back to T-101 via line 6 as make-up for the recirculating slurry or for disposal as indigenous oil product via line 3.

The cake from centrifuge M-102 and pump P-103 flows through line 4 into a port near the top of the multi-stage gravity settling counter-current solids/solvent contactor unit T-102. The solids pass downward through T-102 where they are contacted countercurrently with a hydrocarbon solvent immiscible in water and all of which has an atmospheric boiling point above that of water and below 550° F. and a viscosity of less than 500 centipoise flowing upward. For this particular embodiment of the invention, in certain circumstances it will be advantageous to reslurry the separated solids with a water-immiscible solvent all of which has an atmospheric boiling point above 120° F. and below 550° F. and a viscosity of less than 500 centipoise. The solvent extracts the remaining indigenous oil and contaminants from the solids as they pass countercurrently. The product solids slurry in solvent exits the bottom of TK-102 and is pumped with pump P-114 through line 16 into centrifuge M-103.

Centrate removed by centrifuge M-103 passes though P-116 into line 13 and into a lower port of T-102 so that any solids and solvent may be recovered in the extractor T-102.

Solids cake from centrifuge M-103 passes into desolventizer M-104 through line 18. The design of a solids desolventizer can vary considerably from the present example and one example is described in U.S. Pat. No. 4,518,458 the disclosures of which are incorporated by reference. This example of desolventizer consists of an externally heated vessel in which the solids are slowly tuned and pushed with rotating impellers and an inert gas such as nitrogen is heated and recirculated through the vessel. On FIG. 2 the solids cake enters the desolventizer M-104 through line 18 and passes down M-104 wherein the solvent is vaporized by a stream of inert gas entering through line 53. The desolventizer operates at about 350° F. and about atmospheric pressure. The substantially solvent free solids leave M-104 through line 14 at about 350° F. and are cooled in a solids cooler E-109 and leave the battery limits as solids product at ambient temperature through line 54.

The solvent laden inert gas exits M-104 at about 300° F. through line 41 and enters a scrubber T-104 where it washed countercurrently with cooled solvent at about 150° F. entering through line 46. Solvent removed from the solids is condensed out of the solvent laden inert gas and exits T-104 with the scrubbing solvent through line 43. The scrubbing solvent passes through pump P-106 and exits a line which splits into lines 44 and 45. Line 44 carries the excess condensed solvent to line 62 and to the solvent surge drain tank TK-103. Line 45 carries the circulating solvent to cooler E-105 where it is indirectly cooled with water and then to line 46 and into scrubber T-104.

The cooled inert gas containing some solvent vapor exits the top of scrubber T-104 through line 42 and is combined with make-up nitrogen through line 47 into line 48 which in turn enters blower M-106. The compressed gas exits blower 106 at about 200° F. through line 49 which splits into lines 50 and 51. Line 50 carries purged excess gas to line 23 and into condenser E-102. The inert gas in line 51 enters heaters E-107 and E-108 where the temperature is raised to about 350° F. The heated gas then enters the desolventizer M-104 through line 53.

Clean solvent which accumulates from various sources described below is accumulated in the solvent.surge/drain tank TK-103 from which is pumped to the lower part of the extractor T-102 with pump P-113 through line 31. Extractor T-102 operates at temperatures between 80° F. and 250° F. The overflow solvent containing indigenous oil and other contaminants exits the top of the extractor T-102 and flows into the extractor surge/drain tank TK-102. From TK-102 the contaminated solvent is pumped through line 17 with the distillation feed pump P-108 and into the upper portion of the distillation tower T-103 which is operated at below atmospheric pressure, typically between 3 and 8 pounds per square inch absolute pressure. It is the purpose of the solvent distillation tower T-103 to vaporize the bulk of the solvent entering it via stream 17 and to separate it from the contaminant and the remaining solvent by distillation. To aid in this separation by fractionation, a reflux of pure solvent is provided through line 40. Product solvent vapors exit the top of T-103, are condensed by water cooled condenser E-104 and flow into reflux drum D-102. Remaining vapors are further cooled and condensed in vent condenser E-110 and pass into vacuum system M-105. Condensed solvent from M-105 is returned to TK-103 via lines 7 and 8. Recovered solvent from D-102 flows to reflux pump P-105 from where it is split into line 40 as reflux to T-103 and to line 11 as product which passes into line 8 and TK-103.

The unvaporized solvent plus contaminant pass downward through T-103 and exit the bottom through line 32 which divides into streams 12 and 33. Stream 33 passes through reboiler E-103 where it is vaporized by condensing steam and the vapor conducted into the bottom of T-103. Hot contaminated solvent in line 12 enters solvent stripper T-105 which also operates at between 3 and 8 pounds per square inch absolute pressure. In T-105 the remaining solvent is removed from the contaminant so as to give the correct solvent content in the contaminant to provide ease of handling for further processing. To achieve this, stripping steam is injected into the bottom of the stripper vessel through line 55. The concentrated contaminant stream exits the bottom of T-105 with the desired solvent level through line 59 and is pumped with pump P-118 off the battery limits.

The vapors from the solvent stripper T-105 exit the vessel through the top in line 57 and pass into heat exchanger E-110 where the vapors are cooled and condensed with indirect cooling water cooling. The liquid condensate containing both solvent and water from E-110 flows to oil-water separator D-103. Vapors from D-103 are routed to vacuum system M-105. Water separated in D-103 is pumped with pump P-112 through line 61 for disposal. Solvent separated in D-103 exits the vessel in line 62 and is pumped with P-111 to TK-103. Make-up solvent from battery limits flows through line 15 to TK-103.

In the version of FIG. 2 in which a multi-stage gravity settling counter-current solids/solvent contactor is not used, contactor T-102, feed pump P-114, and centrifuge M-103 are replaced by a rotary pressure or vacuum filter or a perforated basket centrifuge. For this version, the other equipment pieces of FIG. 2 are retained and continue to serve their previous functions although the connecting piping may be somewhat modified.

In the version of this invention in FIG. 2 denoted as the "once-through solvent" version, line 17 which contains primarily solvent but also indigenous oil and contaminants present in the feed is directed to another processing facility such as an oil refinery. In this case, equipment designated P-108, T-103, E-104, D-102, P-105, E-111, M-105, E-103, P-104, T-105, P-115, E-110, D-103, P-111, and P-112 and connected pipelines are not required.

What is claimed is:

1. A continuous process for solvent-extraction of solvent-soluble contaminants from water-wet soil, sediment or sludge comprising the steps of:
    a) adding contaminated water-wet soil, sediment, or sludge to a recirculating stream for forming a wet slurry mixture with said recirculating stream containing a water-immiscible solvent composed of a hydrocarbon compound or compounds having an atmospheric boiling point above that of water and below 550° F. and a viscosity of less than 500 centipoise and dehydrated or partially dehydrated feed solids from step (c) below;
    b) passing said wet slurry mixture through an evaporation system at a temperature and pressure such that said water is evaporated and contaminants are extracted into the solvent for forming a dehydrated slurry containing at least a majority of said solvent with at least 95% of the water removed;
    c) adding a portion of said dehydrated slurry back into said recirculating stream such that said stream contains dehydrated or partially dehydrated feed solids;
    d) separating the majority of solids from the majority of the solvent;
    e) reslurrying the separated solids with fresh solvent;
    f) repeating steps (d) and (e) until at least 90% of said contaminants are extracted from said soil, sediment or sludge;
    g) performing a final separation of solids in accordance with step (d);
    h) separating the solvent from the extracted contaminants;
    i) separating the solvent from the solids: and,
    j) recycling recovered solvent in said continuous process.

2. A process, as defined in claim 1 where the water-wet soil, sediment or sludge includes about one percent (1%) to about ninety percent (90%) solids, from about five percent (5%) to about ninety-nine percent (99%) water, and from 1 ppm to about ninety-four percent (94%) solvent-soluble contaminant or contaminants.

3. A process, as defined in claim 2, where the separated solvent containing the contaminant or contaminants is fed to a solvent distillation system where the water-immiscible solvent is recovered and separated from the solvent-soluble contaminant or contaminants.

4. A process as defined in claim 2, where the separated solvent containing the contaminant or contaminants is reprocessed for solvent and contaminant recovery or disposal independent of said continuous process.

5. A process, as defined in claim 3, where the separating step further comprises a further stage of separation, where the separated waste solids from the first stage is passed through a solids desolventizer to recover residual solvent on the solids.

6. A process, as defined in claim 1, where the evaporation and extraction stages are independent of each other.

7. A process, as defined in claim 1, where water evaporation takes place in a stage or stages subsequent to the extraction stage or stages.

8. A process, as defined in claim 1, where water evaporation takes place in more than one stage.

9. A process as defined in claim 8, where water evaporation utilizes energy efficient multi-effect evaporation or single effect mechanical vapor recompression systems.

10. A process as defined in claim 1, where the water-wet soils, sediments, and sludges are fed directly into a recirculating slurry in the dehydration/extraction stages and not into a fluidizing tank.

11. A process as defined in claim 1, where the water-wet soils, sediments and sludges contain light organic materials as contaminants and which are separated from the feed and recovered separately as part of the dehydration step.

12. A continuous process for solvent-extraction of solvent-soluble contaminants from water-wet soil, sediment or sludge containing water-immiscible oil comprising the steps of:

a) adding contaminated water-wet soil, sediment, or sludge to a recirculating stream for forming a wet slurry mixture with said recirculating stream containing water-immiscible oil and dehydrated or partially dehydrated feed solids from step (c) below;

b) passing said wet slurry mixture through an evaporation system at a temperature and pressure such that said water is evaporated and for forming a dehydrated slurry containing at least a majority of said water-immiscible oil with at least 95% of the water removed;

c) adding a portion of said dehydrated slurry back into said recirculating stream such that said stream contains dehydrated or partially dehydrated feed solids;

d) separating the majority of solids from the majority of the water-immiscible oil;

e) recycling a portion of said solids-free indigenous oil into said recirculated stream;

f) slurrying said separated solids with a water-immiscible solvent composed of a hydrocarbon compound or compounds to extract the contaminants from said soil, sediment or sludge into said solvent;

g) separating the solids from said solvent as in step (d);

h) repeating sets (f) and (g) until at least 90% of said contaminants is extracted from said soil, sediment or sludge;

i) separating the solvent from the extracted contaminants;

j) separating the solvent from the solids: and, k) recycling recovered solvent from steps (i) and (j) into step (f) in a continuous process.

13. A process, as defined in claim 12 where the water-wet oily soil, sediment or sludge includes about one percent (1%) to about ninety percent (90%) solids, from about five percent (5%) to about ninety-nine percent (99%) water, and from about 1 ppm to ninety-four percent (94%) solvent-soluble contaminant or contaminants.

14. A process, as defined in claim 13, where the separated solvent containing the contaminant or contaminants is fed to a solvent distillation system where the water-immiscible solvent is recovered and separated from the solvent-soluble contaminant or contaminants.

15. A process as defined in claim 13, where the separated solvent containing the contaminant or contaminants is reprocessed for solvent and contaminant recovery or disposal independent of said continuous process.

16. A process, as defined in claim 14, where the separating step further comprises a further stage of separation, where the separated waste solids from the first stage is passed through a solids desolventizer to recover residual solvent on the solids.

17. A process, as defined in claim 12, where water evaporation takes place in more than one stage.

18. A process as defined in claim 17, where water evaporation utilizes energy efficient multi-effect evaporation or single effect mechanical vapor recompression systems.

19. A process as defined in claim 12, wherein the water-immiscible solvent of step (f) is composed of a hydrocarbon compound or compounds having an atmospheric boiling point above that of water and below 550° F. and a viscosity of less than 500 centipoise.

20. A process as defined in claim 12, wherein the water-immiscible solvent of step (f) is composed of a hydrocarbon compound or compounds all of which have an atmospheric boiling point above 120° F. and below 550° F. and a viscosity of less than 500 centipoise.

* * * * *